(12) United States Patent
Uka et al.

(10) Patent No.: US 10,685,787 B2
(45) Date of Patent: Jun. 16, 2020

(54) ELECTROLYTIC CAPACITOR INCLUDING CONDUCTIVE POLYMER WITH COPOLYMER DOPANT AND CONDUCTIVE POLYMER DISPERSION

(71) Applicant: Panasonic Intellectual Property Management Co., Ltd., Osaka (JP)

(72) Inventors: Youichirou Uka, Hyogo (JP); Katsuya Miyahara, Osaka (JP); Hiroshi Kojima, Aichi (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 130 days.

(21) Appl. No.: 15/702,655

(22) Filed: Sep. 12, 2017

(65) Prior Publication Data
US 2018/0005760 A1    Jan. 4, 2018

Related U.S. Application Data

(63) Continuation of application No. PCT/JP2016/001426, filed on Mar. 14, 2016.

(30) Foreign Application Priority Data

Mar. 31, 2015   (JP) .................................. 2015-072748

(51) Int. Cl.
*H01G 9/028*    (2006.01)
*H01B 1/12*     (2006.01)
(Continued)

(52) U.S. Cl.
CPC .............. *H01G 9/028* (2013.01); *C08L 65/00* (2013.01); *H01B 1/122* (2013.01); *H01G 9/048* (2013.01);
(Continued)

(58) Field of Classification Search
CPC .......... H01G 9/028; H01G 9/048; H01G 9/15; C08L 65/00; C08L 25/18; H01B 1/122;
(Continued)

(56) References Cited

U.S. PATENT DOCUMENTS

2012/0104308 A1*  5/2012  Okamoto ........... C08G 73/0266
                                              252/62.2
2012/0256117 A1* 10/2012  Sugawara .............. H01G 9/028
                                              252/62.2
(Continued)

FOREIGN PATENT DOCUMENTS

CN        101486839      *   7/2009
CN        101486839  A       7/2009
(Continued)

OTHER PUBLICATIONS

English Translation of Chinese Search Report dated Aug. 30, 2018 for the related Chinese Patent Application No. 201680017271.5.
(Continued)

*Primary Examiner* — Alexander Usyatinsky
(74) *Attorney, Agent, or Firm* — McDermott Will & Emery LLP (57) ABSTRACT

An electrolytic capacitor includes an anode body, a dielectric layer formed on the anode body, and a conductive polymer layer covering at least a part of the dielectric layer. The conductive polymer layer includes a conductive polymer and a polymer dopant. The polymer dopant includes a copolymer that includes a first monomer unit and a second monomer unit. The first monomer unit has a sulfonate group. Time second monomer unit has a functional group represented by a formula (i); —CO—$R^1$—COOH (where $R^1$ represents an aliphatic hydrocarbon group having 1 to 8 carbon atoms, an aromatic group, or a divalent group
(Continued)

—$OR^2$—, $R^2$ representing an aliphatic hydrocarbon group having 1 to 8 carbon atoms or an aromatic group).

10 Claims, 1 Drawing Sheet

(51) Int. Cl.
*H01G 9/15* (2006.01)
*C08L 65/00* (2006.01)
*H01G 9/048* (2006.01)

(52) U.S. Cl.
CPC ....... *H01G 9/15* (2013.01); *C08G 2261/1424* (2013.01); *C08G 2261/3223* (2013.01); *C08G 2261/51* (2013.01); *C08G 2261/794* (2013.01)

(58) Field of Classification Search
CPC .............. C09D 165/00; C08G 2261/51; C08G 2261/794; C08G 2261/1424; C08G 2261/3223
See application file for complete search history.

(56) References Cited

U.S. PATENT DOCUMENTS

| | | | | |
|---|---|---|---|---|
| 2014/0211374 A1* | 7/2014 | Sugihara | ................. | C08F 12/30 361/527 |
| 2014/0328007 A1* | 11/2014 | Endo | .................... | H01G 9/0036 361/528 |

FOREIGN PATENT DOCUMENTS

| | | | |
|---|---|---|---|
| CN | 204792459 | * | 7/2009 |
| JP | 2009302013 | * | 12/2009 |
| WO | 2011/004833 | | 1/2011 |
| WO | WO2011/004833 | * | 1/2011 |

OTHER PUBLICATIONS

International Search Report of PCT application No. PCT/JP2016/001426 dated May 24, 2016.

* cited by examiner

ELECTROLYTIC CAPACITOR INCLUDING CONDUCTIVE POLYMER WITH COPOLYMER DOPANT AND CONDUCTIVE POLYMER DISPERSION

RELATED APPLICATIONS

This application is a continuation of the PCT international Application No. PCT/JP2016/001426, filed on Mar. 14, 2016, which claims the benefit of foreign priority of Japanese patent application No. 2015-072748, filed on Mar. 31, 2015, the contents all of which are incorporated herein by reference.

BACKGROUND

1. Technical Field

The present disclosure relates to an electrolytic capacitor including a conductive polymer layer, and relates to a conductive polymer dispersion useful for forming a conductive polymer layer.

2. Description of the Related Art

As small-sized, large capacitance, and low ESR (equivalent series resistance) capacitors, a promising candidate is an electrolytic capacitor including an anode body on which a dielectric layer is formed and a conductive polymer layer formed so as to cover at least a part of the dielectric layer. The conductive polymer layer includes a n-conjugated polymer and a dopant. With use of the dopant, the n-conjugated polymer can have high conductivity.

As the dopant, a polymer dopant having a sulfonate group such as polystyrenesulfonic acid may be used. PCT International Publication No. WO2011/004833 proposes using, as the polymer dopant, a copolymer of a monomer having a sulfonate group and a monomer having chelating ability.

SUMMARY

An electrolytic capacitor according to a first aspect of the present disclosure includes an anode body, a dielectric layer formed on the anode body, and a conductive polymer layer covering at least a part of the dielectric layer. The conductive polymer layer includes a conductive polymer and a polymer dopant. The polymer dopant includes a copolymer that includes a first monomer unit and a second monomer unit. The first monomer unit has a sulfonate group. The second monomer unit has a functional group represented by a following formula (1):

$$—CO—R^1—COOH \qquad (1)$$

(where $R^1$ represents an aliphatic hydrocarbon group having 1 to 8 carbon atoms, an aromatic group, or a divalent group $—OR^2—$, $R^2$ representing an aliphatic hydrocarbon group having 1 to 8 carbon atoms or an aromatic group).

A conductive polymer dispersion according to a second aspect of the present disclosure includes a conductive polymer, a polymer dopant, and a solvent. The polymer dopant includes a copolymer that includes a first monomer unit and a second monomer unit. The first monomer unit has a sulfonate group. The second monomer unit has a functional group represented by a following formula (1):

$$—CO—R^1—COOH \qquad (1)$$

(where $R^1$ represents an aliphatic hydrocarbon group having 1 to 8 carbon. atoms, an aromatic group, or a divalent group $—OR^2—$, $R^2$ representing an aliphatic hydrocarbon group having 1 to 8 carbon atoms or an aromatic group).

According to the present disclosure, it is possible to increase a restoration effect for the dielectric layer and reduce leakage current in the electrolytic capacitor.

DETAILED DESCRIPTION OF EMBODIMENT

With use of the dopant described in PCT International Publication No. WO 2011/004833, it is difficult to sufficiently obtain a restoration effect for a dielectric layer and thus sufficiently suppress leakage current.

[Electrolytic Capacitor]

An electrolytic capacitor according to one exemplary embodiment of the present disclosure includes an anode body, a dielectric layer formed on the anode body, and a conductive polymer layer covering at least a part of the dielectric layer. The conductive polymer layer includes a conductive polymer and a polymer dopant. The polymer dopant (first polymer dopant) includes a copolymer that includes a first monomer unit having a sulfonate group and a second monomer unit having a functional group represented by a following formula (1):

$$—CO—R^1—COOH \qquad (1)$$

(where $R^1$ represents an aliphatic hydrocarbon group having 1 to 8 carbon atoms, an aromatic group, or a divalent group $—OR^2—$, $R^2$ representing an aliphatic hydrocarbon group having 1 to 8 carbon atoms or an aromatic group). The first polymer dopant, includes the second monomer unit, and thus the restoration effect for the dielectric layer can be improved. As a result, the leakage current and a short circuit can be suppressed.

Figure 1:
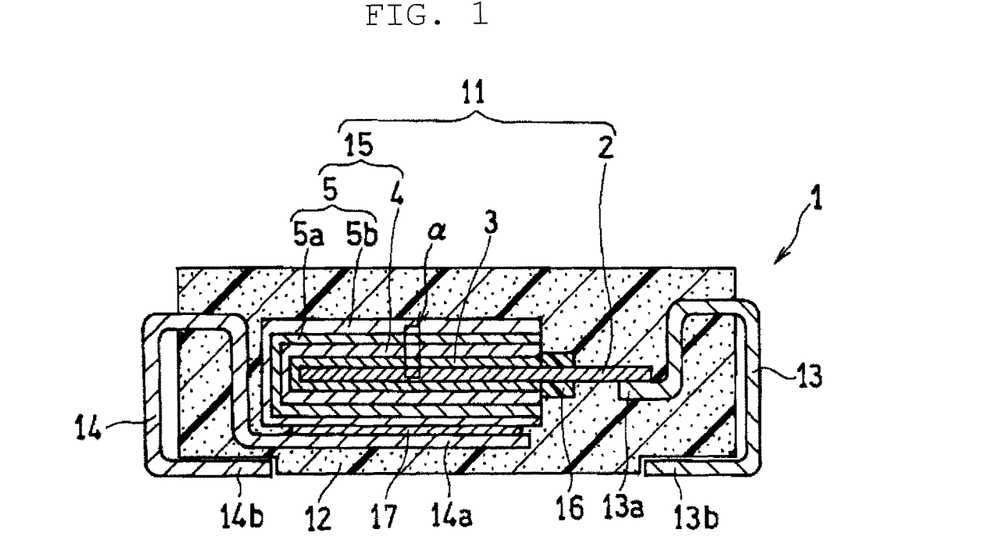
FIG. 1 is a schematic sectional view illustrating an electrolytic capacitor according to one exemplary embodiment of the present disclosure.
Figure 2:
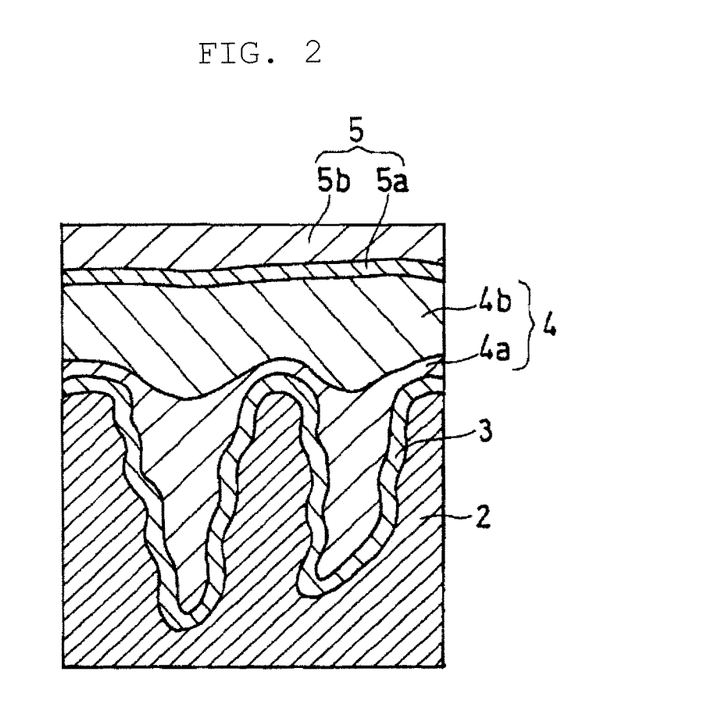
FIG. 2 is an enlarged view illustrating an area surrounded by a solid line α in FIG. 1.

FIG. 1 is a schematic sectional view illustrating the electrolytic capacitor according to the one exemplary embodiment of the present disclosure. FIG. 2 is an enlarged view strafing an area surrounded by a solid line α in FIG. 1.

Electrolytic capacitor 1 includes capacitor element 11, resin outer packing 12 that encapsulates capacitor element 11, and anode terminal 13 and cathode terminal 14 that are exposed to the outside of resin outer packing 12. Capacitor element 11 includes foil-like or plate-like anode body 2, dielectric layer 3 covering anode body 2, and cathode portion 15 covering dielectric layer 3. Anode terminal 13 is electrically connected to anode body 2, and cathode terminal 14 is electrically connected to cathode portion 15. Resin outer packing 12 has an almost rectangular parallelepiped outer shape, and therefore electrolytic capacitor 1 also has an almost rectangular parallelepiped outer shape.

Anode body 2 and cathode portion 15 are opposite to each other with dielectric layer 3 interposed between anode body 2 and cathode portion 15. Cathode portion 15 includes conductive polymer layer 4 covering dielectric layer 3 and cathode layer 5 covering conductive polymer layer 4. Cathode layer 5 shown in the drawings has a two-layer structure, and includes carbon layer 5a in contact with conductive polymer layer 4 and silver paste layer 5b covering a surface of carbon layer 5a.

Anode body 2 has an area on which insulating separation part 16 is formed so as to zonally cover a surface of anode body 2, the area being in an end. of anode body 2 that protrudes from cathode portion 15 and being adjacent to cathode portion 15. Thus, a contact between cathode portion 15 and anode body 2 is restricted at the area. The end of anode body 2 that protrudes from cathode portion 15 is electrically connected to first end 13a of anode terminal 13 by welding or the like. Meanwhile, cathode layer 5 formed as an outermost layer of cathode portion 15 is electrically connected to first end 14a of cathode terminal 14 via conductive adhesive material 17 (e.g. a mixture of a thermosetting resin and metal particles). Second end 13b of anode terminal 13 and second end 14b of cathode terminal 14 are drawn out from side surfaces of resin outer packing 12 which are different from each other, respectively. And second end 13b of anode terminal 13 and second end 14b of cathode terminal 14 each extend to one main flat surface (lower surface in FIG. 1) in an exposed state. The exposed parts of the terminals (anode terminal 13 and cathode terminal 14) on the flat surface are used for, for example, solder connections to a substrate (not shown in the drawings) on which electrolytic capacitor 1 is to be mounted.

Dielectric layer 3 is formed on a part of a surface of a conductive material constituting anode body 2. Specifically, dielectric layer 3 can be formed by anodizing the surface of the conductive material constituting anode body 2. Accordingly, dielectric layer 3 is formed along a surface (including a more inside surface, i.e., an inner wall surface of pores or pits) of anode body 2 as shown in FIG. 2.

In the example shown in the drawing, first conductive polymer layer 4a is formed so as to cover dielectric layer 3, and second. conductive polymer layer 4b is formed so as to cover first conductive polymer layer 4a. A structure of the conductive polymer layer, however, is not particularly limited, and may be a single-layer structure or a multi-layer structure having two or more layers. First conductive polymer layer 4a does not necessarily cover whole (a whole surface of) dielectric layer 3 and is satisfactory as long as first conductive polymer layer 4a is formed so as to cover at least a part of dielectric layer 3. In a same manner, second conductive polymer layer 4b does not necessarily cover whole (a whole surface of) first conductive polymer layer 4a and is satisfactory as long as second conductive polymer layer 4b is formed so as to cover at least a part of first conductive polymer layer 4a. In the example shown in the drawing, first conductive polymer layer 4a and second. conductive polymer layer 4b are shown as conductive polymer layer 4. In general, a layer including a conductive polymer, such as first conductive polymer layer 4a, second conductive polymer layer 4b, and conductive polymer layer 4, may be referred to as a solid electrolyte layer.

Dielectric layer 3 is formed along the surface of anode body 2, and therefore irregularities are formed on a surface of dielectric layer 3 in accordance with a shape of the surface of anode body 2. First conductive polymer layer 4a is preferred to be formed. so as to fill such irregularities of dielectric layer 3.

Hereinafter, a configuration of the electrolytic capacitor is described in more detail.

(Anode Body)

A conductive material having a large surface area can be used as the anode body. Examples of the conductive material include a valve metal, an alloy including a valve metal, and a compound including an valve metal. These materials can be used alone or in combination of two or more materials. As the valve metal, there can be preferably used, for example, titanium, tantalum, alum in and/or niobium. These metals are suitable as a constituent material of the anode body because oxides of these metals have a high dielectric constant. Examples of the anode body include one obtained by roughening a surface of a base material (e.g. a foil- or plate-like base material) formed from a conductive material, a molded body that is prepared from particles of a conductive material, and a sintered body obtained by sintering the molded body.

(Dielectric Layer)

The dielectric layer is formed by anodizing, through an anodizing treatment or the like, a conductive material on the surface of the anode body, and therefore the dielectric layer includes an oxide of the conductive material (particularly, a valve metal). For example, when tantalum is used as the valve metal, the dielectric layer includes $Ta_2O_5$, and when aluminum is used as the valve metal, the dielectric layer includes $Al_2O_3$. The dielectric layer is not limited to these examples, and a layer is acceptable as the dielectric layer as long as the layer functions as a dielectric body.

When the anode body is a foil- or plate-like anode body, and a surface of the anode body is roughened, the dielectric layer is formed along an inner wall surface of pores or pits at a surface of anode body 2 as shown in FIG. 2.

(Conductive Polymer Layer)

The conductive polymer layer is satisfactory as long as the conductive polymer layer is formed so as to cover at least a part of the dielectric layer, and the conductive polymer layer may be formed so as to cover a whole surface of the dielectric layer. The anode body has a large surface area, and the dielectric layer is formed not only on an outer surface but also on a more inside surface, i.e., an inner wall surface of pores or pits of the anode body. It is preferred that the conductive polymer layer be also formed on such a dielectric layer that has been formed on the inner wall surface to increase coverage by the conductive polymer layer.

The conductive polymer layer includes a conductive polymer and a dopant. The dopant may be included in the conductive polymer layer in a state of being doped in the conductive polymer. The dopant may also be included in the conductive polymer layer in a state of being bonded to the conductive polymer. The conductive polymer layer has to include at least a first polymer dopant as the dopant and may further include a dopant (e.g., a low-molecular-weight dopant and a second polymer dopant) other than the first polymer dopant.

(Conductive Polymer)

As the conductive polymer, there can be used, for example, a publicly known polymer used for an electrolytic capacitor, such as a n-conjugated conductive polymer. Examples of such a conductive polymer include a polymer having, as a basic skeleton, for example, polypyrrole, polythiophene, polyfuran, polyaniline, polyacetylene, polyphenylene, polyphenylene vinylene, polyacene, and/or polythiophene vinylene.

Such a polymer includes a homopolymer, a copolymer of two or more kinds of monomers, and derivatives (e.g. a substitute having a substituent) of these polymers. For example, polythiophene includes poly(3,4-ethylenedioxythiophene) and the like. Such a conductive polymer has high conductivity and is excellent in ESE, characteristics.

As the conductive polymer, one conductive polymer may be used alone, or two or more conductive polymers may be used in combination.

A weight average molecular weight of the conductive polymer is not particularly limited, and ranges, for example, from 1,000 to 1,000,000, inclusive.

The conductive polymer can be obtained by, for example, polymerizing a raw material of the conductive polymer (a precursor of the conductive polymer). The conductive polymer that is bonded to or doped with the polymer dopant can be obtained by polymerizing a raw material of the conductive polymer in presence of the polymer dopant. Examples of the precursor of the conductive polymer include a monomer that constitutes the conductive polymer and/or an oligomer in which some monomers are linked to each other. As a polymerization method, both chemical oxidation polymerization and electrolytic oxidation polymerization can be employed.

The electrolytic oxidation polymerization proceeds by, for example, applying, to a polymerization liquid containing a raw material of the conductive polymer, a constant current ranging from 0.05 mA/cm$^2$ to 10 mA/cm$^2$, inclusive, or a constant voltage ranging from 0.5 V to 10 V, inclusive. A catalyst may be added to the polymerization liquid to accelerate the polymerization. As the catalyst, there can be used, for example, ferrous sulfate and ferric sulfate. The polymerization liquid may further contain a dopant.

The chemical oxidation polymerization proceeds by mixing a raw material of the conductive polymer with an oxidant. As the oxidant used for the chemical oxidation polymerization, there can be used, for example, a persulfate (e.g., ammonium persulfate, sodium persulfate, and potassium persulfate) and a metal sulfonate. At this time, for example, ferrous sulfate and ferric sulfate may be used as a catalyst. The chemical oxidation polymerization may be performed in presence of a dopant as necessary.

For the polymerization, a solvent (first solvent) for dissolving or dispersing a raw material of the conductive polymer (and a dopant) may be used as necessary. Examples of the first solvent include water, a water-soluble organic solvent, and a mixture of water and the water-soluble organic solvent. The water-soluble organic solvent is not particularly limited, and examples of the water-soluble organic solvent include acetone, tetrahydrofuran, methanol, ethanol, isopropanol, and/or N-methyl-2-pyrrolidone. When the conductive polymer is synthesized with use of the first solvent, the conductive polymer can be obtained in a state of being dispersed in the first solvent. Then, it is preferred to remove, as necessary, impurities such as an unreacted monomer, an undoped or excessive dopant, a persulfate, and a catalyst by, for example, dialysis or an ion exchange method.

The conductive polymer may be synthesized in advance before attached to the anode body including the dielectric layer. Alternatively, in the case of the chemical oxidation polymerization, the polymerization of the conductive polymer can be performed in presence of the anode body including the dielectric layer.

(Dopant)

The first polymer dopant is a copolymer of a first monomer having a polymerizable group and a sulfonate group and a second monomer having a polymerizable group and a functional group of the above formula (1) (hereinafter, also simply referred to as a functional group (1)). With use of such a copolymer, distribution uniformity of the functional group (1) can be increased to enhance a restoration function. The copolymer may be any of a random copolymer, a block copolymer, and a graft copolymer. The copolymer, however, is preferred to be a random copolymer from the viewpoint of acquiring a uniform restoration function over the conductive polymer layer.

In each of the first polymer dopant and the monomers that constitute the first polymer dopant, an anionic group (specifically, the sulfonate group, and a carboxyl group of the functional group (1)) is not particularly limited as long as the anionic group can generate an anion in a dissociated state, and the anionic group may be a salt of the anionic group (for example, a metal salt (e.g., an alkali metal salt) such as a sodium salt, an ammonium salt, a sulfonium salt, and a phosphonium salt), or an ester of the anionic group. The present disclosure also includes an electrolytic capacitor including the first polymer dopant in which the anionic group forms a salt or an ester.

In the first monomer and the second monomer, the polymerizable group is preferred to be a radically polymerizable group and. is, for example, a carbon-carbon double bond and a carbon-carbon triple bond.

Examples of the first monomer include a vinyl monomer having a sulfonate group and a diene monomer (e.g., isoprenesulfonic acid) having a sulfonate group. Examples of the vinyl monomer having a sulfonate group include aliphatic vinyl monomers having a sulfonate group, such as vinylsulfonic acid, allylsulfonic acid; and 2-acrylamido-2-methylpropanesulfonic acid; and aromatic vinyl monomers having a sulfonate group, such as styrenesulfonic acid and a substitute of styrenesulfonic acid (e.g., vinyltoluenesulfonic acid).

The first monomer includes a salt of the vinyl monomer having a sulfonate group or the diene monomer having a sulfonate group (for example, a metal salt an alkali metal salt) such as a sodium salt, an ammonium salt, a sulfonium salt, and a phosphonium salt). The first polymer dopant may include one first monomer unit or may include two or more first monomer units. As the first monomer unit, an aromatic vinyl monomer unit having a sulfonate group (including a salt of the aromatic vinyl monomer unit) is preferred.

Examples of the aliphatic hydrocarbon group represented by $R^1$ in the functional group (1) of the second monomer include chain hydrocarbon groups (e.g., $C_{2-8}$ alkylene groups such as 1,2-ethylene, propyylene, and trimethylene; $C_{1-8}$ alkylidene groups such as methylene and ethylidene; and $C_{2-8}$ alkenylene groups such as vinylene, 1-propene-1, 3-diyl) and cyclic aliphatic hydrocarbon groups (e.g., $C_{4-8}$ cycloalkylene groups such as cyclohexane-1,4-diyl). From the viewpoint of suppressing variety in molecular weight of the first polymer dopant so as to increase a yield of the first polymer dopant, for example, an alkylene group, an alkylidene group, and a cycloalkylene group are preferred among the aliphatic hydrocarbon groups. Especially, a $C_{2-6}$ alkylene group (particularly, a $C_{2-4}$ alkylene group and the like), a $C_{1-6}$ alkylidene group (particularly, a $C_{1-4}$, alkylidene group and the like), a $C_{5-8}$ cycloalkylene group (particularly, a $C_{5-6}$ cycloalkylene group and the like) are preferred, for example. The aliphatic hydrocarbon group may have a substituent such as a hydroxyl group or an alkoxy group.

Examples of the aromatic group represented by $R^1$ include $C_{6-12}$ arylene groups such as phenylene, tolylene, naphthylene and biphenylene (preferably $C_{6-10}$ arylene groups). An aromatic ring of an arylene group may have a substituent (e.g., an alkyl group such as a methyl group, a hydroxyl group, and an alkoxy group).

Bonding positions of the cyclic aliphatic hydrocarbon group or the aromatic group, which is represented by $R^1$, with two carbonyl groups adjacent to $R^1$ may be on any carbon atom of a hydrocarbon ring (an alicyclic hydrocarbon ring or an aromatic ring) constituting $R^1$ according to a number of atoms in the ring. For example, when a carbon atom of the hydrocarbon ring which is bonded to one carbonyl group is a first position of the hydrocarbon ring, a carbon atom bonded with the other carbonyl group may be a second position, a third position, or a fourth position of the hydrocarbon ring, especially preferably the second position or the third position.

In the divalent group —OR²— represented by R¹, the aliphatic hydrocarbon group and the aromatic group that are represented by R² can be selected from the aliphatic hydrocarbon groups and the aromatic groups exemplified for R¹, respectively. From the viewpoint of increasing hydrophilicity, R² is preferably a $C_{2-6}$ alkylene group or a $C_{1-6}$ alkylidene group, further preferably a $C_{2-4}$ alkylene group or a $C_{1-4}$ alkylidene group, particularly preferably a $C_{2-3}$ alkylene group or a $C_{1-3}$ alkylidene group.

The second monomer has to have at least the polymerizable group and the functional group (1) and may have the polymerizable group, the functional group (1), and a linking group that links these groups. Examples of the second monomer include a vinyl monomer or diene monomer having the functional group (1), and a vinyl monomer or diene monomer having the functional group (1) and the linking group. The first polymer dopant may include one second monomer unit or may include two or more second monomer units. The second monomer may have two or more functional groups (1). In the second monomer having two or more functional groups (1), the functional groups (1) may be the same or different structures.

The linking group is not particularly limited, and may be an aliphatic hydrocarbon group (e.g., an alkylene group and an alkylidene group) or an aromatic group (e.g., an arylene group) as exemplified for R¹ or may be a divalent group having a hetero atom such as an oxygen atom, a nitrogen atom, and/or a sulfur atom.

From the viewpoint of facilitating linking the polymerizable group with the functional group (1), the linking group is preferably, for example, a carbonyl -alkylenedioxy group (—CO—O—R$^a$—O—) and a carbonyl-poly(oxyalkylene) oxy group (—CO—(O—R$^b$)$_n$—O—). Here, R$^a$ represents an alkylene group (preferably a $C_{2-3}$ alkylene group) as exemplified for R¹, and R$^b$ represents a $C_{2-3}$ alkylene group such as ethylene or propylene. And, n, which represents a number of repeating oxyalkylene groups, is an integer of 2 to 10. Examples of the second monomer having such a linking group include an ester of a polymerizable unsaturated carboxylic acid such as (meth)acrylic acid, maleic acid, or fumaric acid and a dicarboxylic acid corresponding to the functional group (1) with an alkylene glycol (HO—R$^a$—OH) or a polyalkylene glycol (H—(O—R$^b$)$_n$—OH). Particularly, it is considered that the second monomer having an oxy $C_{2-3}$ alkylene group or a polyoxy $C_{2-3}$ alkylene group is high in hydrophilicity and is thus high in solubility and dispersibility in water. Therefore, by using such a second monomer, synthesis of the first polymer dopant can be facilitated, and thus the yield of the first polymer dopant can be improved. Further, it can be easy to suppress variety in molecular weight of the first polymer dopant. In the present specification, acrylic acid and methacrylic acid are collectively referred to as (meth)acrylic acid.

A preferred unit of such a second monomer unit having an oxyalkylene group or a polyoxyalkylene group is, for example, either a unit represented by a following formula (1a):

$$—CH_2—CR^3R^4— \quad (1a)$$

(where R³ is a hydrogen atom or a methyl group, and R⁴ is —CO—(OCH₂CH₂)$_{n1}$—O—CO—R$^{1a}$—COOH, n1 being an integer of 1 to 10 and R$^{1a}$ being an aliphatic hydrocarbon group having 1 to 8 carbon atoms or an aromatic group), or a unit represented by a following formula (1b):

$$—CHR^5—CHR^6— \quad (1b)$$

(where R⁵ is a carboxyl group or —CO—(OCH₂CH₂)$_{n2}$—O—CO—R$^{1b}$—COOH, and R⁶ is —CO—(OCH₂CH₂)$_{n3}$—O—CO—R$^{1c}$—COOH, n2 and n3 being each an integer of 1 to 10 and R$^{1b}$ and R$^{1c}$ being each an aliphatic hydrocarbon group having 1 to 8 carbon atoms or an aromatic group).

R$^{1a}$, R$^{1b}$, and R$^{1c}$ each correspond to R¹ of the functional group (1). The aliphatic hydrocarbon group and the aromatic group that are represented by R$^{1a}$, R$^{1b}$, and R$^{1c}$ can be selected from the aliphatic hydrocarbon groups and the aromatic groups exemplified for R¹, respectively.

And, n1, n2, and n3, each of which represents a number of repeating oxyethylene groups, are each preferably an integer of 1 to 5, more preferably an integer of 1 to 3.

When the second monomer unit has an ester bond (—CO—O), it is possible to increase polarity of the first polymer dopant, so that a restoration property for the dielectric layer can be further improved. Further, such a second monomer unit enables easy and stable synthesis of the first polymer clop ant.

A ratio of the second monomer unit to a total of the first monomer unit and the second monomer unit which are included in the first polymer dopant ranges, for example, from 5 mol % to 60 mol %, inclusive, preferably from 5 mol % to 50 mol %, inclusive, or from 10 mol % to 40 mol %, inclusive, further preferably from 10 mol % to 30 mol %, inclusive. When the ratio of the second monomer unit is in such ranges, the first monomer unit and the second monomer unit exhibit their actions in a good balance to facilitate improvement in conductivity and dispersibility of the conductive polymer, and the restoration function of the dielectric layer which is brought about by the conductive polymer layer can easily be improved.

The copolymer may include a third monomer unit other than the first monomer unit and the second monomer unit. The copolymer may include one third monomer unit or may include two or more third monomer units. In the first polymer dopant, however, a total proportion of the first monomer unit and the second monomer unit is preferred to be larger than a proportion of the third monomer unit.

A third monomer corresponding to the third monomer unit is not particularly limited as long as the third monomer is a monomer copolymerizable with the first monomer and/or the second monomer. Examples of the third monomer include polymerizable unsaturated carboxylic acids such as meth(acrylic) acid, maleic acid, and fumaric acid, or derivatives (e.g., esters, amides, and imides) of the polymerizable unsaturated carboxylic acids.

A ratio of the first polymer dopant included in the conductive polymer layer preferably ranges from 10 parts by mass to 1,000 parts by mass, inclusive, further preferably from 50 parts by mass to 200 parts by mass, inclusive, with respect to 100 parts by mass of the conductive polymer.

The first polymer dopant can be synthesized by, for example, polymerization (e.g., radical polymerization) of the first monomer, the second monomer, and the third monomer added as necessary. The polymerization can be performed in a solvent (second solvent). Examples of such a second solvent include water, a water-soluble organic solvent (e.g., the water-soluble organic solvents exemplified for the first solvent), and a mixture of water and the water-soluble organic solvent.

More specifically, the first polymer dopant can be synthesized by housing in a reaction vessel a monomer solution containing the second solvent, the first monomer, and/or the second monomer, and the third monomer added as necessary, removing oxygen from the reaction vessel, and then adding a polymerization initiator to allow progress of polymerization at a predetermined temperature. The monomer solution may also contain a molecular weight modifier (e.g., a thiol compound and a quinone compound) as necessary. From the view point of avoiding a rapid polymerization reaction, the monomers or the monomer solution may be charged into the reaction vessel over a plurality of times.

The polymerization initiator is not particularly limited, and there can. be used, for example, a peroxide, a persulfate ammonium persulfate and potassium persulfate), and an azo compound. Examples of the peroxide include hydrogen peroxide, cumene hydroperoxide, and di-t-butyl peroxide.

Examples of the azo compound include 2,2'-azobis(4-methoxy-2,4-dimethylvaleronitrile), 2,2'-azobis(2,4-dimethylvaleronitrile), and 2,2'-azobisisobutyronitrile.

The conductive polymer layer may further include another dopant (a low-molecular-weight dopant and/or a second polymer dopant) as necessary. A ratio of such another dopant, however, is preferred to be 5 parts by mass or less with respect to 100 parts by mass of the first polymer dopant. When the conductive polymer layer includes a first conductive polymer layer and a second conductive polymer layer, at least the second conductive polymer layer is preferred to include the first polymer dopant. For example, the first conductive polymer layer may include the low-molecular-weight dopant and/or the second polymer dopant, and the second conductive polymer layer may include the first polymer dopant. As the other dopant, one dopant can be used alone, or two or more dopants can be used in combination.

As the low-molecular-weight dopant, there can be used a compound (low-molecular-weight compound (monomer compound)) having an anionic group such as a sulfonate group, a carboxyl group, a phosphate group (—O—P(=O)(—OH)$_2$), and/or a phosphonate group (—P(=O)(—OH)$_2$). As such a compound, there can be used, for example, a cyclic compound in which an anionic group is bonded to an aromatic ring (e.g. a $C_{6-14}$ aromatic ring) of benzene, naphthalene, anthracene, or the like, or to a fused ring of an aromatic ring (e.g. a $C_{6-14}$ aromatic ring) and an aliphatic ring. As the anionic group, a sulfonate group is preferred, and a combination of the sulfonate group with an anionic group other than the sulfonate group is also acceptable. The aromatic ring and/or aliphatic ring constituting the cyclic compound may also include a substituent (e.g. an alkyl group such as a methyl group, and an oxo group (=O)), other than the anionic group. Specific examples of such a compound include benzenesulfonic acid, alkylbenzenesulfonic acids such as p-toluenesulfonic acid, naphthalenesulfonic acid, and anthraquinonesulfonic acid.

As the second polymer dopant, there can be used, for example, a polymer compound having an anionic group such as a sulfonate group, a phosphate group (—O—P(=O)(—OH)$_2$), and/or a phosphonate group (—P(=O)(—OH)$_2$). Among the anionic groups, a sulfonate group is preferred. As a polymeric dopant having a sulfonate group, there can be exemplified a homopolymer or a copolymer of a monomer having a sulfonate group (e.g. a vinyl monomer having a sulfonate group and a diene monomer having a sulfonate group, such as isoprenesulfonic acid). The vinyl monomer having a sulfonate group can be selected from those exemplified for the first polymer dopant. The copolymer may be a copolymer formed of two or more kinds of monomers having a sulfonate group or a copolymer formed of a monomer having a sulfonate group and another monomer. The second polymer dopant also includes, for example, polyester sulfonic acid, a phenolsulfonic acid novolac resin, a homopolymer of the second monomer, and a copolymer of the second monomer and a copolymerizable monomer (e.g., a vinyl monomer having, for example, a phosphate group, a phosphonate group, and/or a carboxyl group) that is different from the second monomer.

In the low-molecular-weight dopant and the second polymer dopant, the anionic group is not particularly limited as long as the anionic group can generate an anion in a dissociated state, and the anionic group may be a salt or ester of the above-mentioned anionic group.

(Others)

A whole thickness (average thickness) of the conductive polymer layer ranges, for example, from 6 μm to 150 μm, inclusive, preferably from 10 μm to 60 μm, inclusive.

When the first conductive polymer layer and the second conductive polymer layer are formed, an average thickness of the second conductive polymer layer ranges, for example, from 5 μm to 100 μm, inclusive, or from 5 μm to 50 μm, inclusive. A ratio of the average thickness of the second conductive polymer layer to an average thickness of the first conductive polymer layer is, for example, 5 times or more, or 10 times or more.

The conductive polymer layer may further include, as necessary, a publicly known additive and/or a publicly known conductive material (e.g. a conductive inorganic material such as manganese dioxide; and/or a TCNQ complex salt) other than the conductive polymer.

In the meantime, for example, a layer to enhance adhesion may be interposed between the dielectric layer and the conductive polymer layer or between the first conductive polymer layer and the second conductive polymer layer. The first conductive polymer layer and the second. conductive polymer layer may each be formed of one layer or may be formed of a plurality of layers.

(Cathode Layer)

The carbon layer is satisfactory as long as the carbon layer has conductivity, and the carbon layer can be configured to include, for example, a conductive carbon material such as graphite. For the silver paste layer, for example, there can be used a composition including a silver powder and a binder resin (e.g., an epoxy resin). The cathode layer is not limited to this configuration and is satisfactory as long as the cathode layer is configured to have a function of power collection.

The anode terminal and the cathode terminal can be configured to include, for example, a metal such as copper or a copper alloy. As a material of the resin outer packing, there can be used, for example, an epoxy resin.

The electrolytic capacitor of the present disclosure is not limited to the electrolytic capacitor having the structure described above, and can be any of variously structured electrolytic capacitors. Specifically, the present disclosure can also be applied to, for example, a wound electrolytic capacitor and an electrolytic capacitor including a metal powder sintered body as the anode body.

[Method for Producing Electrolytic Capacitor]

An electrolytic capacitor can be produced through a first step of preparing an anode body, a second step of forming a dielectric layer on the anode body, and a third step of treating the dielectric layer-formed anode body with a treatment solution containing a conductive polymer and a dopant (e.g., a first polymer dopant). The method for producing an electrolytic capacitor may also include a step (fourth step) of further forming a cathode layer.

Hereinafter, the steps are described in more detail.

(First Step)

In the first step, an anode body is formed by a publicly known method according to a kind of the anode body.

The anode body can be prepared by, for example, roughening a surface of a foil- or plate-like base material formed from a conductive material. The roughening is satisfactory as long as irregularities are formed on the surface of the base material and may be performed, for example, by subjecting the surface of the base material to etching (e.g., electrolytic etching) or by depositing particles of the conductive material on the surface of the base material using a gas phase method such as vapor deposition.

(Second Step)

In the second step, a dielectric layer is formed on the anode body. The dielectric layer is formed by anodizing a surface of the anode body. The anodization can be performed by a publicly known method, for example, an anodizing treatment. The anodizing treatment can be performed by, for example, immersing the anode body in an anodizing solution to impregnate, with the anodizing solution, the surface (a more inside surface, i.e., an inner wall surface of pores or pits) of the anode body, and applying a voltage between the anode body as an anode and a cathode immersed in the anodizing solution. As the anodizing solution, for example, an aqueous solution of phosphoric acid, an aqueous solution of ammonium phosphate, or an aqueous solution of ammonium adipate is preferred to be used.

(Third Step)

In the third step, a conductive polymer layer is formed with use of a treatment solution containing a conductive polymer and a first polymer dopant. The treatment solution may also contain another dopant as necessary. Alternatively, a first conductive polymer layer and a second conductive polymer layer may be formed with use of a first treatment solution and a second treatment solution which are different in composition (or in concentration or viscosity of the conductive polymer) from each other. The first conductive polymer layer may be formed with use of the first treatment solution containing the other dopant, and the second conductive polymer layer may be formed with use of the second treatment solution containing the first polymer dopant so as to cover the first conductive polymer layer.

In the third step, for example, the dielectric layer-formed anode body is immersed in the treatment solution or the treatment solution is dropwise added to the dielectric layer-formed anode body. The treatment solution is impregnated by the immersion or the dropwise addition, into the surface (a more inside surface, i.e., an inner wall surface of pores or pits on which the dielectric layer has been formed) of the dielectric layer-formed anode body. The anode body that has been impregnated with the treatment solution may be dried as necessary. During the drying, the anode body may be heated as necessary. The third step allows attachment of the conductive polymer and the first polymer dopant to the surface of the dielectric layer-formed anode body, thus forming the conductive polymer layer.

In a preferred exemplary embodiment, a conductive polymer dispersion is used as the treatment solution. The conductive polymer dispersion contains the conductive polymer, the first polymer dopant, and a solvent (third solvent). By using such a conductive polymer dispersion, the conductive polymer layer describe above can be easily formed and the conductive polymer layer stable in quality can be obtained. The present disclosure also includes such a conductive polymer dispersion.

(Conductive Polymer Dispersion)

In the conductive polymer dispersion, the conductive polymer and/or the first polymer dopant (preferably the conductive polymer and the first polymer dopant) is dispersed in the third solvent.

A ratio of the first polymer dopant contained in the conductive polymer dispersion ranges preferably from 10 parts by mass to 1,000 parts by mass, inclusive, further preferably from 50 parts by mass to 200 parts by mass, inclusive, with respect to 100 parts by mass of the conductive polymer.

As the third solvent, there can be exemplified water, an organic solvent, and a mixture of water and the organic solvent. Examples of the organic solvent include aliphatic alcohols having 1 to 5 carbon atoms (e.g. aliphatic monools such as methanol, ethanol, propanol, and 1-butanol; and aliphatic polyols such as ethylene glycol and glycerin); aliphatic ketones such as acetone; nitriles such as acetonitrile and benzonitrile; amides such as N,N-dimethylformamide; and/or sulfoxides such as dimethyl sulfoxide. As the third solvent, one solvent may be used alone, or two or more solvents may be used in combination.

A concentration of solid content in the conductive polymer dispersion ranges, for example, from 0.1% by mass to 10% by mass, inclusive, preferably from 1% by mass to 5% by mass, inclusive.

The conductive polymer and/or first polymer dopant dispersed in the conductive polymer dispersion is preferably particles (or a powder). An average particle size of the particles dispersed in the dispersion preferably ranges from 5 nm to 500 nm, inclusive. The average particle size can be obtained, for example, from a particle size distribution measured by a dynamic light scattering method.

The conductive polymer dispersion can be obtained by dispersing the conductive polymer and the first polymer dopant in a solvent. Alternatively, as the conductive polymer dispersion, there may be used a dispersion (dispersion a) obtained by removing impurities from a polymerization liquid of the conductive polymer and then mixing the first polymer dopant with the polymerization liquid, or a dispersion (dispersion b) obtained by removing impurities from a polymerization liquid formed through polymerization of the conductive polymer in presence of the first polymer dopant. In using such a dispersion, those exemplified for the third solvent may be used as a solvent (first solvent) during the polymerization, or the third solvent may be added when impurities are removed. The third solvent may further be added to the dispersions a and b.

The conductive polymer dispersion may also contain another dopant and/or a publicly known additive as necessary. A ratio of the other dopant contained in the conductive polymer dispersion is preferred to be 5 parts by mass or less with respect to 100 parts by mass of the first polymer dopant.

(Fourth Step)

In the fourth step, a cathode layer is formed by sequentially stacking a carbon layer and a silver paste layer on the surface (preferably the conductive polymer layer formed) of the anode body obtained in the third step.

EXAMPLES

Hereinafter, the present disclosure is specifically described with reference to examples and comparative examples. The present disclosure, however, is not limited to the examples below.

Production Example 1

(1) Synthesis of polymer dopant

1 L of purified water was added to a 2-L stirrer-equipped separable flask, and sodium styrenesulfonate as a first monomer and an acrylic acid derivative represented by a formula (1A) as a second monomer were added to the flask so that a uniform monomer solution was obtained.

(1A)

A molar ratio between the first monomer and the second monomer (=first monomer unit:second monomer unit) was 80:20.

0.5 g of ammonium persulfate as an oxidant was further added to the monomer solution, and a polymerization reaction between the first monomer and the second monomer was allowed to progress over 8 hours, so that a first polymer dopant (polymer dopant A) of a copolymer was obtained. Then, an operation which included adding purified water and an ion-exchange resin to the polymer dopant A, stirring a mixture of the polymer dopant A, purified water, and the ion-exchange resin, and. filtrating the mixture, was repeated to remove impurities.

(2) Synthesis of conductive polymer

An aqueous dispersion liquid of the polymer dopant A (first polymer dopant) (content proportion of copolymer: 3% by mass) was charged into 1L stirrer-equipped vessel. Then, sodium persulfate as an oxidant and ferric sulfate as a catalyst were added to the aqueous dispersion liquid of the polymer dopant A at ratios of 2 parts by mass and 0.2 parts by mass, respectively, with respect to 100 parts by mass of the aqueous dispersion liquid, followed by gradual dropwise addition of 3,4-ethylenedioxythiophene at a ratio of 1 part by mass, to perform chemical oxidation polymerization. Then, an operation which included adding an ion-exchange resin to the obtained aqueous dispersion liquid containing the first polymer dopant and the conductive polymer (poly(3,4-ethylenedioxythiophene)), stirring a mixture of the aqueous dispersion liquid and the ion-exchange resin, and filtrating the mixture, was repeated to remove impurities in the liquid., so that a polymer dopant A-doped conductive polymer (conductive polymer A) was obtained.

Production Example 2

A first polymer dopant (polymer dopant B) of a copolymer was obtained in the same manner as in (1) of Production Example 1 except for using an acrylic acid derivative represented by a formula (1B) as the second monomer.

(1B)

A polymer dopant B-doped conductive polymer (conductive polymer B) was obtained in the same manner as in (2) of Production Example 1 except for using the polymer dopant B as the first polymer dopant.

Production Example 3

A first polymer dopant (polymer dopant C) of a copolymer was obtained in the same manner as in Production Example 1 except for using an acrylic acid derivative represented by a formula (1C) as the second monomer.

(1C)

A polymer dopant C-doped conductive polymer (conductive polymer C) was obtained in the same manner as in (2) of Production Example 1 except for using the polymer dopant C as the first polymer dopant.

Production Examples 4 to 7

First polymer dopants (polymer dopants D to G) of various copolymers were obtained in the same manner as in (1) of Production Example 1 except for changing a content ratio between the first monomer and the second monomer.

The molar ratios between the first monomer unit and the second monomer unit (=first monomer unit second monomer unit) are as follows.

Production Example 4

95:5 (polymer dopant D)

Production Example 5

90:10 (polymer dopant E)

Production Example 6

75:25 (polymer dopant F)

Production Example 7

50:50 (polymer dopant G)

Subsequently, polymer dopant D to G-doped conductive polymers (conductive polymers D to G) were obtained in the same manner as in (2) of Production Example 1 except for using the polymer dopants D to G, respectively, as the first polymer dopant.

Production Example 8

A polymer dopant H (second polymer dopant) was obtained in the same manner as in Production Example 1 except for using only the first monomer, sodium styrenesulfonate and not using the second monomer.

A polymer dopant H-doped conductive polymer (conductive polymer H) was obtained in the same manner as in (2) of Production Example 1 except for using the polymer dopant H in place of the first polymer dopant.

Production Example 9

A polymer dopant I (second polymer dopant) was obtained in the same manner as in Production Example 1 except for using only the second monomer, the acrylic acid derivative represented by the formula (1A) and not using the first monomer.

A polymer dopant I-doped conductive polymer (conductive polymer was obtained in the same manner as in (2) of Production Example 1 except for using the polymer dopant I in place of the first polymer dopant.

Production Example 10

A polymer dopant J (second polymer dopant) was obtained in the same manner as in Production Example 1 except for obtaining a polymer dopant of a copolymer with use of acrylic acid in place of the second monomer. A molar ratio between the first monomer unit and an acrylic acid unit (first monomer unit acrylic acid unit) was 80:20.

A polymer dopant J-doped. conductive polymer (conductive polymer J) was obtained in the same manner as in (2) of Production Example 1 except for using the polymer dopant J in place of the first polymer dopant.

Example 1

An electrolytic capacitor was manufactured in a manner described below, and characteristics of the electrolytic capacitor were evaluated.
(1) Step of Preparing Anode Body (First Step)

Both surfaces of an aluminum foil (thickness: 100 μm) as a base material were roughened by etching so that an anode body was produced.
(2) Step of Forming Dielectric Layer (Second Step)

A part of the anode body at a side of one end (a part from a separation part to the one end) was immersed in an anodizing solution, and a 70 V DC voltage was applied for 20 minutes to form a dielectric layer including aluminum oxide.
(3) Step of Forming Conductive Polymer Layer (Third Step)

The anode body including the dielectric layer was immersed in an aqueous dispersion liquid (first treatment solution) containing 1% by mass of the conductive polymer G. And then the anode body including the dielectric layer was taken out from the first treatment solution, and dried at 120° C. for a period ranging from 10 minutes to 30 minutes. The immersion in the first treatment solution and the drying were repeated again, so that a first conductive polymer layer was formed so as to cover at least a part of a surface of the dielectric layer. An average thickness of the first conductive polymer layer measured by a scanning electron microscope (SEM) was about 1 μm.

The anode body including the first conductive polymer layer was immersed in an aqueous dispersion liquid (second treatment solution) containing 4% by mass of the conductive polymer A. And then, the anode body including the first conductive polymer layer was taken out from the second treatment solution, and dried at 120° C. for a period ranging from 10 minutes to 30 minutes. The immersion in the second treatment solution and the drying were repeated another two times, so that a second conductive polymer layer was formed so as to cover at least a part of a surface of the first conductive polymer layer and at least a part of the dielectric layer that is exposed without being covered with the first conductive polymer layer. An average thickness of the second conductive polymer layer measured by a SEM was about 30 μm.
(4) Step of Forming Cathode Layer (Fourth Step)

The anode body that includes the dielectric layer covered with the conductive polymer layer was immersed in a dispersion liquid obtained by dispersing graphite particles in water. And then, the anode body that includes the dielectric layer covered with the conductive polymer layer was taken out from the dispersion liquid, and dried to form a carbon layer. The drying was performed at a temperature ranging from 130° C. to 180° C., inclusive, for a period ranging from 10 minutes to 30 minutes.

Next, a silver paste including silver particles and a binder resin (epoxy resin) was applied to a surface of the carbon layer and heated at a temperature ranging from 150° C. to 200° C., inclusive for a period ranging from 10 minutes to 60 minutes to cure the binder resin, so that a silver paste layer was formed. Thus, a cathode layer which was configured to include the carbon layer and the silver paste layer was formed.

As described above, a capacitor element was manufactured.
(5) Assembling of Electrolytic Capacitor The cathode layer of the capacitor element was joined with one end (first end) of a cathode terminal with a conductive adhesive material. The other end of the anode body, which protruded from the capacitor element, was joined with one end (first end) of an anode terminal by laser welding.

Next, resin outer packing made of an insulating resin was formed around the capacitor element by a transfer molding method. In forming the resin outer packing, the other end (second end) of the anode terminal and the other end (second end) of the cathode terminal were made to be drawn out from the resin outer packing. Thus, an electrolytic capacitor (A1) of Example 1 was completed. In the same manner as described above, a total of 250 electrolytic capacitors were produced.

Examples 2 to 7

250 electrolytic capacitors for each of Examples 2 to 7 referred as electrolytic capacitors A2 to A7 were produced in the same manner as in Example 1 except for using, as the second treatment solution, aqueous dispersion liquids containing 4% by mass of the conductive polymers B to G.

Example 8

250 electrolytic capacitors for Example 8 referred as electrolytic capacitors A8 were produced in the same manner as in Example 1 except for using, as the first treatment solution, an aqueous dispersion liquid containing 1% by mass of the conductive polymer A.

Example 9

250 electrolytic capacitors for Example 9 referred as electrolytic capacitors A9 were produced in the same manner as in Example 2 except for using, as the first treatment solution, an aqueous dispersion liquid containing 1% by mass of the conductive polymer B.

Example 10

250 electrolytic capacitors for Example 10 referred as electrolytic capacitors A10 were produced in the same manner as in Example 3 except for using, as the first treatment solution, an aqueous dispersion liquid containing 1% by mass of the conductive polymer C.

Comparative Example 1

250 electrolytic capacitors for Comparative Example 1 referred as electrolytic capacitors B1 were produced in the same manner as in Example 1 except for using, as the second treatment solution, an aqueous dispersion liquid containing 4% by mass of the conductive polymer H.

Comparative Example 2

250 electrolytic capacitors for Comparative Example 2 referred as electrolytic capacitors B2 were produced in the same manner as in Example 1 except for using, as the second treatment solution, an aqueous dispersion liquid containing 4% by mass of the conductive polymer I.

Comparative Example 3

250 electrolytic capacitors for Comparative Example 3 referred as electrolytic capacitors B3 were produced in the same manner as in Example 1 except for using, as the second treatment solution, an aqueous dispersion liquid containing 4% by mass of the conductive polymer J.

(6) Evaluation
(a) Electrostatic Capacity and ES

Electrostatic capacity (initial electrostatic capacity) (μF) at a frequency of 120 Hz was measured for the electrolytic capacitor with an LCR meter for 4-terminal measurement. An ESR value (initial ESR value) (mΩ) at a frequency of 100 kHz was measured for the electrolytic capacitor with an LCR meter for 4-terminal measurement. The electrostatic capacity and the ESR value were measured for each of randomly selected 120 electrolytic capacitors, and average values for the electrostatic capacity and the ESR value were calculated.

(b) Leakage Current (LC)

A voltage of 10 V was applied between anode body 2 and cathode layer 5 of the electrolytic capacitor and leakage current was measured after 40 seconds of applying the voltage. Then, an electrolytic capacitor having a leakage current amount exceeding 100 μA was determined to be defective, and an LC defective ratio (%) was calculated in each of the examples and comparative examples. The LC defective ratio, which is a ratio of a number of defective electrolytic capacitors to a total number of electrolytic capacitors measured, was used as a reference index of the leakage current. Table 1 shows evaluation results of Examples 1 to 10 and Comparative Examples 1 to 3.

TABLE 1

|  | Electrostatic capacity (μF) | ESR (mΩ) | Leakage current (%) |
| --- | --- | --- | --- |
| Electrolytic capacitor A1 | 2.1 | 32.8 | 0.1 |
| Electrolytic capacitor A2 | 2.2 | 33.6 | 1.7 |
| Electrolytic capacitor A3 | 2.2 | 36.0 | 0.9 |
| Electrolytic capacitor A4 | 2.1 | 33.0 | 4.9 |
| Electrolytic capacitor A5 | 2.0 | 33.8 | 2.1 |
| Electrolytic capacitor A6 | 2.2 | 33.0 | 0.1 |
| Electrolytic capacitor A7 | 2.1 | 41.2 | 0.1 |
| Electrolytic capacitor A8 | 1.9 | 36.0 | 0.1 |
| Electrolytic capacitor A9 | 1.9 | 42.1 | 0.7 |
| Electrolytic capacitor A10 | 1.9 | 49.6 | 0.9 |

TABLE 1-continued

|  | Electrostatic capacity (μF) | ESR (mΩ) | Leakage current (%) |
| --- | --- | --- | --- |
| Electrolytic capacitor B1 | 2.1 | 32.7 | 29.3 |
| Electrolytic capacitor B2 | 1.7 | 177.3 | 11.1 |
| Electrolytic capacitor B3 | 2.2 | 39.9 | 13.0 |

As shown in Table 1, the leakage current in the examples is reduced compared with in the comparative examples. In addition, high electrostatic capacity is obtained and the ESR is suppressed low in the examples.

The electrolytic capacitor according to the present disclosure can be used for various uses in which reduction of leakage current is required.

What is claimed is:

1. An electrolytic capacitor comprising:
   an anode body;
   a dielectric layer formed on the anode body; and
   a conductive polymer layer covering at least a part of the dielectric layer, wherein:
   the conductive polymer layer includes a conductive polymer and a polymer dopant, and the polymer dopant includes a copolymer that includes a first monomer unit having a sulfonate group and a second monomer unit having a functional group represented by a following formula (1):

$$-CO-R^1-COOH \qquad (1)$$

where $R^1$ represents an aliphatic hydrocarbon group having 1 to 8 carbon atoms, a substituted or unsubstituted $C_{6-12}$ arylene group, or a divalent group $-OR^2-$, $R^2$ representing an aliphatic hydrocarbon group having 1 to 8 carbon atoms or an aromatic group a substituted or unsubstituted $C_{6-12}$ arylene group.

2. The electrolytic capacitor according to claim 1, wherein a ratio of the second monomer unit to a total of the first monomer unit and the second monomer unit ranges from 5 mol % to 50 mol %, inclusive.

3. The electrolytic capacitor according to claim 1, wherein the first monomer unit is an aromatic vinyl monomer unit having a sulfonate group.

4. The electrolytic capacitor according to claim 1, wherein the second monomer unit is either a unit represented by a following formula (1a):

$$-CH_2-CR^3R^4- \qquad (1a)$$

where $R^3$ represents a hydrogen atom or a methyl group, and $R^4$ represents $-CO-(OCH_2CH_2)_{n1}-O-CO-R^{1a}-COOH$, n1 being an integer of 1 to 10 and $R^{1a}$ being an aliphatic hydrocarbon group having 1 to 8 carbon atoms or a substituted or unsubstituted $C_{6-12}$ arylene group, or a unit represented by a following formula (1b):

$$-CHR^5-CHR^6- \qquad (1b)$$

where $R^5$ represents a carboxyl group or $-CO-(OCH_2CH_2)_{n2}-O-CO-R^{1b}-COOH$, and $R^6$ represents $-CO-(OCH_2CH_2)_{n3}-O-CO-R^{1c}-COOH$, n2 and n3 being each an integer of 1 to 10 and $R^{1b}$ and $R^{1c}$ being each an aliphatic hydrocarbon group having 1 to 8 carbon atoms or a substituted or unsubstituted $C_{6-12}$ arylene group.

5. The electrolytic capacitor according to claim 1, wherein:

the aliphatic hydrocarbon group represented by $R^1$ is a $C_{2-6}$ alkylene group, a $C_{1-6}$ alkylidene group, or a $C_{5-8}$ cycloalkylene group, and in the divalent group —$OR^2$—, the aliphatic hydrocarbon group represented by $R^2$ is a $C_{2-6}$ alkylene group, a $C_{1-6}$ alkylidene group, or a $C_{5-8}$ cycloalkylene group.

6. The electrolytic capacitor according to claim 4, wherein the aliphatic hydrocarbon group represented by each of $R^{1a}$, $R^{1b}$, and $R^{1c}$ is a $C_{2-6}$ alkylene group, a $C_{1-6}$ alkylidene group, or a $C_{5-8}$ cycloalkylene group.

7. A conductive polymer dispersion comprising:
a conductive polymer;
a polymer dopant; and
a solvent,
wherein the conductive polymer includes a polymer having, as a basic skeleton, at least one selected from the group consisting of polypyrrole, polythiophene, polyfuran, polyaniline, polyacetylene, polyphenylene, polyphenylene vinylene, polyacene, and polythiophene vinylene, and
wherein the polymer dopant includes a copolymer that includes a first monomer unit having a sulfonate group and a second monomer unit having a functional group represented by a following formula (1):

—CO—$R^1$—COOH        (1)

where $R^1$ represents an aliphatic hydrocarbon group having 1 to 8 carbon atoms, a substituted or unsubstituted $C_{6-12}$ arylene group, or a divalent group —$OR_2$—, $R^2$ representing an aliphatic hydrocarbon group having 1 to 8 carbon atoms or a substituted or unsubstituted $C_{6-12}$ arylene group.

8. The conductive polymer dispersion according to claim 7, wherein a ratio of the second monomer unit to a total of the first monomer unit and the second monomer unit ranges from 5 mol % to 50 mol %, inclusive.

9. The conductive polymer dispersion according to claim 7, wherein the first monomer unit is an aromatic vinyl monomer unit having a sulfonate group.

10. The conductive polymer dispersion according to claim 7, wherein the second monomer unit is either a unit represented by a following formula (1a):

—$CH_2$—$CR^3R^4$—        (1a)

where $R^3$ represents a hydrogen atom or a methyl group, and $R^4$ represents —CO—$(OCH_2CH_2)_{n1}$—O—CO—$R^{1a}$—COOH, n1 being an integer of 1 to 10 and $R^{1a}$ being an aliphatic hydrocarbon group having 1 to 8 carbon atoms or a substituted or unsubstituted $C_{6-12}$ arylene group, or a unit represented by a following formula (1b):

—$CHR^5$—$CHR^6$—        (1b)

where $R^5$ represents a carboxyl group or —CO—$(OCH_2CH_2)_{n2}$—O—CO—$R^{1b}$—COOH, and $R^6$ represents —CO—$(OCH_2CH_2)_{n3}$—O—CO—$R^{1c}$—COOH, n2 and n3 being each an integer of 1 to 10 and $R^{1b}$ and $R^{1c}$ being each an aliphatic hydrocarbon group having 1 to 8 carbon atoms or a substituted or unsubstituted $C_{6-12}$ arylene group.

* * * * *